Figure 1:
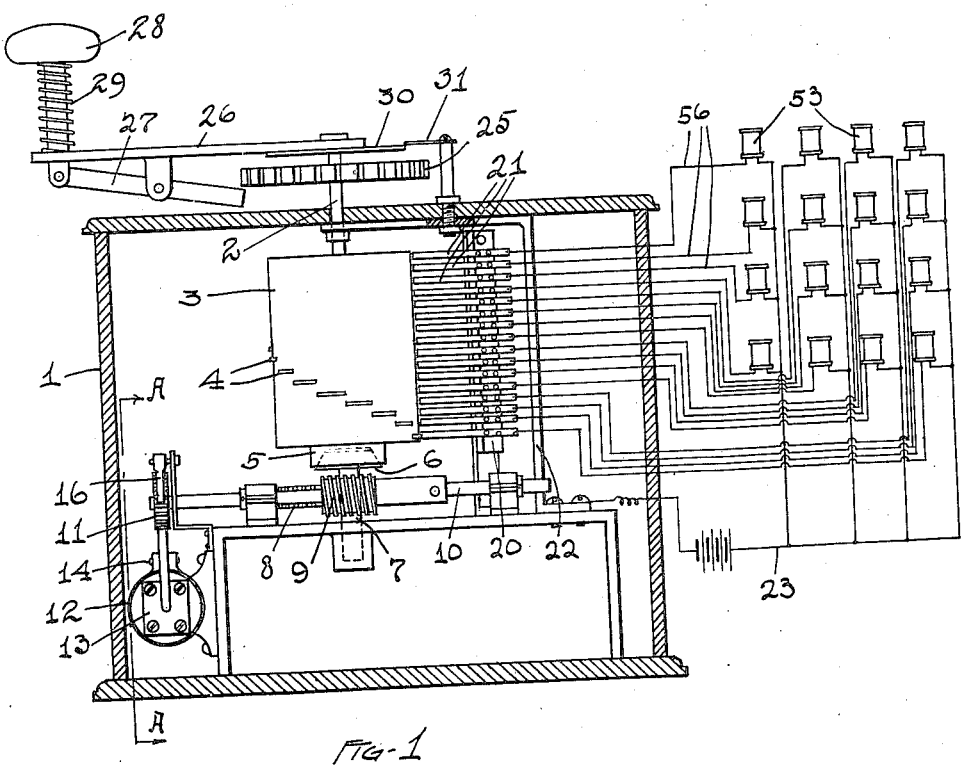

R. L. FRINK.
PRESSURE REGULATING APPARATUS.
APPLICATION FILED JUNE 28, 1915.

1,205,729.

Patented Nov. 21, 1916.
2 SHEETS—SHEET 1.

WITNESSES
O. M. Kappler
Robert M. Sxx

INVENTOR
Robert L. Frink
BY Gay and Oberlin
ATTORNEYS

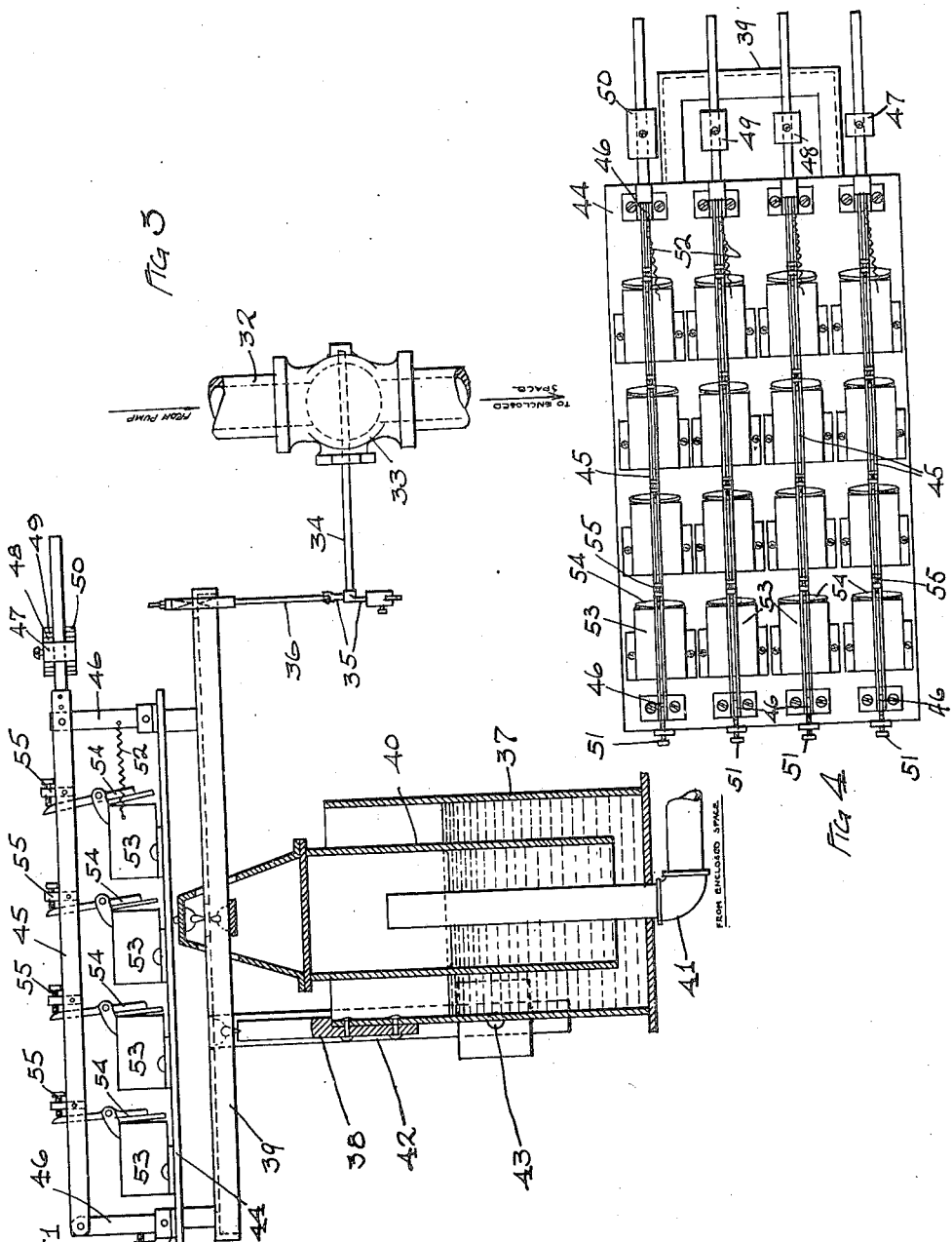

UNITED STATES PATENT OFFICE.

ROBERT L. FRINK, OF LANCASTER, OHIO.

PRESSURE-REGULATING APPARATUS.

1,205,729.

Specification of Letters Patent. Patented Nov. 21, 1916.

Application filed June 28, 1915. Serial No. 36,682.

*To all whom it may concern:*

Be it known that I, ROBERT L. FRINK, a citizen of the United States, and a resident of Lancaster, county of Fairfield, and State of Ohio, have invented a new and useful Improvement in Pressure-Regulating Apparatus, of which the following is a specification, the principle of the invention being herein explained and the best mode in which I have contemplated applying that principle, so as to distinguish it from other inventions.

The present invention relates to the regulation of fluid pressure in an inclosed space, and it provides pressure regulating apparatus designed primarily for use in the drawing of glass. United States Patent No. 972,614, issued to me on October 11, 1910, illustrates apparatus for drawing a glass cylinder from a bath of molten glass, in which the distention of the cylinder is maintained by the pressure of air supplied either to the space between a fixed head and the bath or to a cylinder closed by the drawing bait. The substantially inclosed space to which the air under pressure is supplied communicates with a manometer, and variations in the pressure in the space actuate the manometer to control the supply of air to the space. It is evident that the apparatus of that patent tends to maintain a constant pressure within the inclosed space in the glass cylinder by causing variation in pressure in the cylinder to control the volume of air supplied to the cylinder.

I have determined that it is highly desirable in drawing glass cylinders to control the supply of air to the cylinder by more positive means than a device actuated by the mechanism that draws the cylinder. Furthermore, in drawing a cylinder which is not of uniform diameter, as for instance when a united series of glass bulbs are being drawn, it is necessary that the pressure within the cylinder be intermittently varied in order to distend the cylinder to different diameters at different points. The present invention provides an apparatus which will either automatically or manually control the air supply to establish a predetermined pressure in the cylinder, and which will automatically maintain that established pressure until a different pressure is established.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
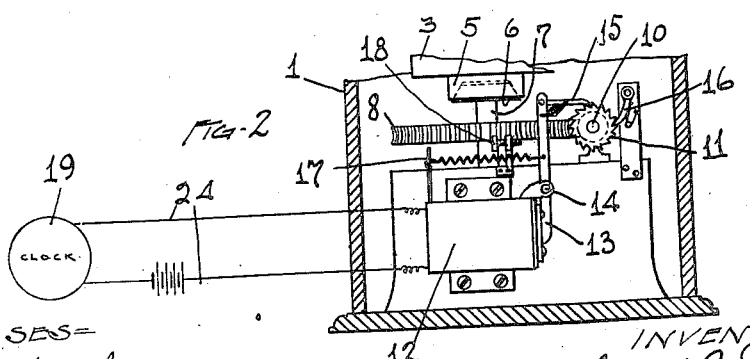

In said annexed drawings, Figure 1 is a sectional view of control mechanism forming part of the invention, and in addition a diagram of magnets controlled thereby; Fig. 2 is a broken section on the line A—A in Fig. 1; Fig. 3 is a broken view, partly in section and partly in side elevation, of valve operating mechanism; and Fig. 4 is a plan view of part of the mechanism shown in Fig. 3.

Referring first to Figs. 1 and 2, the invention provides a casing 1 in which is mounted a rotatable shaft 2 carrying a commutator cylinder 3 provided with a series of helically arranged contacts 4. At the bottom of the cylinder is a cone clutch member 5 frictionally resting on a coöperative clutch member 6 carried by a rotatable shaft 7. The shaft 7 carries a worm gear 8 which meshes with a worm 9 fixed on a shaft 10, the shaft 10 also having fixed thereon a ratchet wheel 11. A magnet 12 is mounted in the casing, and when energized pulls toward itself the lower end of its armature 13 which is pivoted at 14 and carries at its upper end a spring pressed pawl 15 which engages the ratchet wheel 11, reverse movement of the latter being prevented by a spring pressed dog 16. A spring 17 tends to restrain movement of the armature by the magnet and holds the armature normally in position determined by the position of the adjustable stop 18. A clock 19 is included in a circuit 24 with a source of electrical current supply and with the magnet 12, and is arranged to intermittently open and close the circuit. A bracket 20 carries, insulated from each other, a plurality of commutator brushes 21 positioned to contact with the respective contacts 4 when the commutator cylinder 3 is rotated to proper position. A bar 22 of conducting material is mounted in the casing and electrically connects the commutator contacts with a lead 23 which includes a source of current supply and is connected individually with a plurality of magnets which will be later described. A toothed wheel 25 is fixed on the upper end of the shaft 2 and may be engaged by a lever 27 carried by an arm 26 loose on the shaft 2 upon depression of a handle 28 against the force of a spring 29. When the lever 27 is in engagement with the wheel 25 the shaft, and hence the commutator cylinder, may be rotated until a stationary index finger 31 registers with a selected one of suitable indications on a dial 30. The indications on the dial are so arranged that they may be selectively brought into register with the index finger to bring the commutator cylinder into a predetermined position.

Referring now to Figs. 3 and 4, an air or other fluid pressure supply pipe 32 leads from a pump or other pressure device to the inclosed space in which the pressure is to be regulated. It may be assumed, for illustration, that the pipe 32 leads to the inclosed space below the fixed head, or below the drawing bait, in an apparatus similar to that illustrated in Patent No. 972,614. A valve 33 controls the flow of air through the pipe 32, and it may be operated by oscillation of valve rod 34, which bears at its end a counter-weighted lever 35 to which is pivoted an operating rod 36.

The outside and fixed cup 37 of a manometer has secured thereto a support 38 on which is pivoted a lever 39 formed as a rectangular frame. The inside movable cup 40 of the manometer is pivotally connected with the frame 39, and the frame is also pivotally connected with the valve actuating rod 36. A pipe 41 affords communication between the air space within the movable manometer cup 40 and the inclosed space which the pipe 32 supplies and within which it is desired to regulate the pressure. Rigidly secured to the frame 39 is a depending bar 42 carrying a vertically slidable weight 43.

A base 44 is fixedly mounted on the frame 39 and carries any desired number of longitudinally movable parallel bars 45, illustrated as four in number. The bars 45, in order to provide for their movement, are pivotally connected with links 46 which are pivoted to the base. Each of the bars carries a weight which may be secured to the bar in adjusted position, and in the apparatus illustrated the respective bars carry weights 47, 48, 49 and 50 which are each heavier than the other. Rearward movement of each bar is limited by an adjustable stop 51, and a spring 52 tends to retain the bar in its rearward position. Any desirable number of control magnets 53 are mounted on the base, and in the apparatus illustrated four magnets are provided for each of the bars 45. Each of the magnets is provided with an armature 54 pivotally mounted between its ends and adapted to have its lower end drawn rearwardly by its magnet when the latter is energized, its upper end being arranged to engage an adjustable projection 55 secured to the bar 45. The armatures of the four magnets designed to move any given bar 45 have a progressively greater range of movement. All of the magnets are individually connected with the lead 23 as diagrammatically illustrated in Fig. 1, and each of the commutator brushes 21 is connected with an individual magnet by a lead 56.

In operation, if it be desired to draw a cylinder of glass of uniform diameter, it may be assumed that rotation of the commutator cylinder will successively energize the control magnets from the one to the left at the bottom in Fig. 4 to the one to the right at the top. At predetermined intervals the clock will close the primary circuit and thus operate the mechanism to rotate the commutator cylinder to bring its contacts successively into contact with the commutator brushes to thus successively energize the magnets. The valve operating mechanism is so mounted that it is normally in balance and the valve closed. When the first magnet is energized the bar 45 carrying the weight 47 will be moved a given distance to the right, and this will cause a given opening of the valve 32 and the establishment of a predetermined pressure in the inclosed space in the cylinder. As the drawing of the cylinder progresses, and the various factors influencing the pressure within the cylinder vary, the progressive movement of the clock will cause successive energization of the control magnets, so that the bar 45 carrying the weight 47 will be successively moved farther to the right, and so that the bars carrying the heavier weights 48, 49 and 50 will be progressively moved farther to the right. Consequently the valve 32 will be progressively farther open to permit an increasing flow of air into the cylinder with the consequence that the volume of air will be sufficient to maintain a uniform pressure in the cylinder despite the various factors which are influential to decrease that pressure. The inclosed space within the cylinder is in communication with the movable manometer cup which is also connected with the valve operating frame 39, and consequently if the pressure within the cylinder varies from the predetermined pressure positively established by progressive movement of the weights, the manometer cup will rise or fall, as the case may be, and correspondingly decrease or increase the supply of air to the cylinder.

It will be noted that in effect the movement of the weights produces a predetermined load on the manometer cup, and at the same time establishes a predetermined pressure in the cylinder, so that if the actual pressure varies from the predetermined pressure it will raise the manometer cup with its definite load if the pressure be excessive, while the manometer cup will allow itself to be depressed and the valve to be opened by the definite load if the pressure is deficient. The balance of the apparatus may be varied as desired by adjusting the weight 43 vertically on the rigid bar 42.

It is obvious that in the usual manner the clock may be arranged to close the circuit 24 at various desired intervals. Also the range of movement of the armature 13 may be varied to rotate the commutator cylinder through various degrees of movement at each actuation of the mechanism. The lead wires 56 from the several magnets may also be connected with the commutator fingers 21 in any desired order.

By various adjustments of the mechanism the weights, instead of being shifted to progressively increase the load on the manometer and to open the control valve progressively farther, may be shifted to intermittently operate the valve and vary the load on the manometer to any desired and predetermined degree, and consequently any desired variations of pressure may be established and maintained in the inclosed space within the cylinder being drawn.

It is at times, especially in starting to draw a cylinder, impracticable to control the air supply entirely automatically, and in such instances an operator may manually rotate the commutator cylinder by the handle 28 to any desired operative position. This manual operation is allowed by slippage of the clutch members 5 and 6, but their frictional engagement becomes effective again upon release of the handle by the operator.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In pressure regulating apparatus, the combination of means for supplying pressure fluid to an inclosed space; means for controlling the supply to establish a desired pressure; and means actuated by variation of pressure in the space for governing the supply to maintain the established pressure.

2. In pressure regulating apparatus, the combination of means for supplying pressure fluid to an inclosed space; automatic means for controlling the supply to establish a desired pressure; and means actuated by variation of pressure in the space for governing the supply to maintain the established pressure.

3. In pressure regulating apparatus, the combination of means for supplying pressure fluid to an inclosed space; automatic means for intermittently varying the supply to establish different pressures; and means actuated by variation of pressure in the space for governing the supply to maintain the established pressure.

4. In pressure regulating apparatus, the combination of means for supplying pressure fluid to an inclosed space; electrically operated automatic means for controlling the supply to establish a desired pressure; and means actuated by variation of pressure in the space for governing the supply to maintain the established pressure.

5. In pressure regulating apparatus, the combination of means for supplying pressure fluid to an inclosed space; a valve controlling the supply; a lever connected to operate the valve; a movable weight on the lever; automatic means for moving the weight; and a manometer communicating with the space and connected with the lever.

6. In pressure regulating apparatus, the combination of means for supplying pressure fluid to an inclosed space; a valve controlling the supply; a lever connected to operate the valve; a movable weight on the lever; means restraining movement of the weight; a plurality of magnets; armatures respectively adapted when the corresponding magnet is energized to move the weight different distances; and a manometer communicating with the space and connected with the lever.

7. In pressure regulating apparatus, the combination of means for supplying pressure fluid to an inclosed space; a valve controlling the supply; a lever connected to operate the valve; a movable weight on the lever; means restraining movement of the weight; a plurality of magnets; armatures respectively adapted when the corresponding magnet is energized to move the weight different distances; automatic means for energizing the magnets; and a manometer communicating with the space and connected with the lever.

8. In pressure regulating apparatus, the combination of means for supplying pressure fluid to an inclosed space; a valve controlling the supply; a lever connected to operate the valve; a movable weight on the lever; means restraining movement of the weight; a plurality of magnets; armatures respectively adapted when the corresponding magnet is energized to move the weight different distances; a commutator arranged to energize the magnets; automatic means for operating the commutator; and a manometer communicating with the space and connected with the lever.

9. In pressure regulating apparatus, the combination of means for supplying pressure fluid to an inclosed space; a valve controlling the supply; a lever connected to operate the valve; a movable weight on the lever; means restraining movement of the weight; a plurality of magnets; armatures respectively adapted when the corresponding magnet is energized to move the weight different distances; a commutator arranged to energize the magnets; mechanism for operating the commutator; a magnet having an armature adapted when the magnet is energized to actuate the mechanism; a clock arranged to periodically energize the magnet; and a manometer communicating with the space and connected with the lever.

10. In pressure regulating apparatus, the combination of means for supplying pressure fluid to an inclosed space; a valve controlling the supply; a lever connected to operate the valve; a movable weight on the lever; means restraining movement of the weight; a plurality of magnets; armatures respectively adapted when the corresponding magnet is energized to move the weight different distances; a commutator arranged to energize the magnets; mechanism for operating the commutator; a magnet having an armature adapted when the magnet is energized to actuate the mechanism; a clock arranged to periodically energize the magnet; manually operable means for operating the commutator independently of the mechanism; and a manometer communicating with the space and connected with the lever.

11. In pressure regulating apparatus, the combination of means for supplying pressure fluid to an inclosed space; a valve controlling the supply; a lever connected to operate the valve; a longitudinally movable bar mounted on the lever; a weight secured on the bar; a plurality of projections on the bar; a plurality of magnets; armatures for the several magnets arranged to engage the respective projections, the several armatures being movable different distances; means restraining movement of the bar; means for energizing the magnets; and a manometer communicating with the space and connected with the lever.

12. In pressure regulating apparatus, the combination of means for supplying pressure fluid to an inclosed space; a valve controlling the supply; a lever connected to operate the valve; a movable weight on said lever; and time controlled means adapted to automatically move said weight.

13. In pressure regulating apparatus, the combination of means for supplying pressure fluid to an inclosed space; a valve controlling the supply; a lever connected to operate the valve; a movable weight on said lever; time controlled means adapted to move said weight; and a manometer communicating with such space and connected with said lever.

14. In pressure regulating apparatus, the combination of means for supplying pressure fluid to an inclosed space; a valve controlling the supply; a lever connected to operate the valve; a movable weight on said lever; electro-magnetic means adapted to move said weight; time controlled means adapted to actuate said electro-magnetic means; and a manometer communicating with such space and connected with said lever.

15. In pressure regulating apparatus, the combination of means for supplying pressure fluid to an inclosed space; a valve controlling the supply; a lever connected to operate the valve; a movable weight on said lever; a plurality of electro-magnets respectively adapted to variously move said weight; time controlled means adapted to actuate said electro-magnets respectively; and a manometer communicating with such space and connected with said lever.

16. In pressure regulating apparatus, the combination of means for supplying pressure fluid to an inclosed space; a valve controlling the supply; a lever connected to operate the valve; a movable weight on said lever; a plurality of electro-magnets respectively adapted to move said weight different distances, when energized; time controlled means adapted to energize said electro-magnets respectively and in a predetermined sequence; and a manometer communicating with such space and connected with said lever.

Signed by me this 25th day of June, 1915.

ROBERT L. FRINK.

Attested by—
Geo. P. Rising,
H. K. Beck.